UNITED STATES PATENT OFFICE.

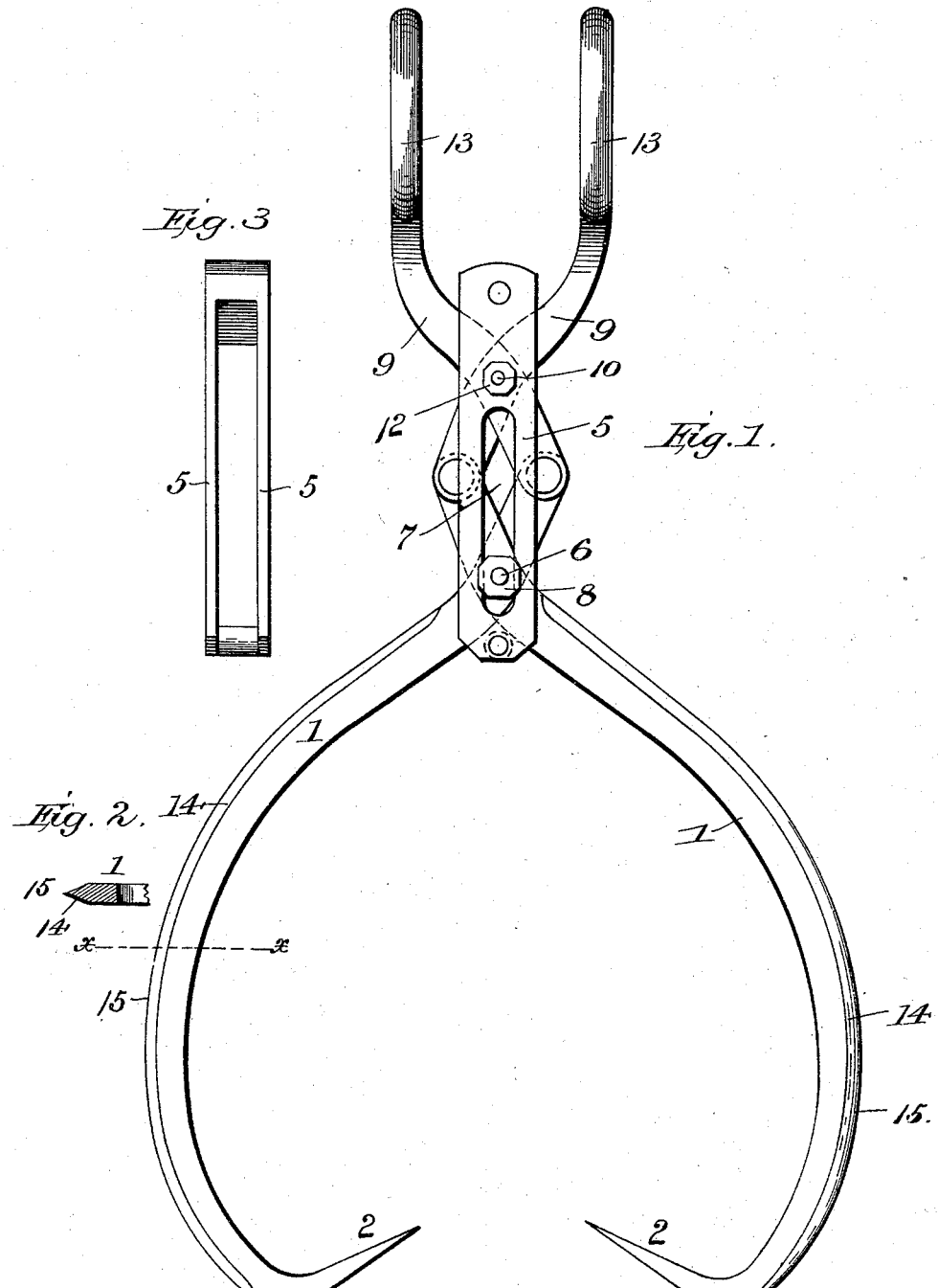

JAMES R. FINLEY, OF DELPHI, INDIANA, ASSIGNOR OF ONE-HALF TO ALBERT H. BARNES AND JOHN H. LYTLE, OF SAME PLACE.

ICE-TONGS.

SPECIFICATION forming part of Letters Patent No. 541,842, dated July 2, 1895.

Application filed September 20, 1894. Serial No. 523,604. (No model.)

*To all whom it may concern:*

Be it known that I, JAMES R. FINLEY, a citizen of the United States, and a resident of Delphi, in the county of Carroll and State of Indiana, have invented certain new and useful Improvements in Ice-Tongs; and I do hereby declare that the following is a full, clear, and exact description of the invention, which will enable others skilled in the art to which it appertains to make and use the same, reference being had to the accompanying drawings, which form a part of this specification.

My invention relates to improvements in ice tongs and its object is to provide an improved device of this character which shall possess superior advantages with respect to efficiency in use.

The invention consists in the novel construction and combination of parts hereinafter fully described and claimed.

In the accompanying drawings, Figure 1 is a side elevation of a pair of ice tongs constructed in accordance with my invention. Fig. 2 is a sectional view of one of the curved legs on the line $x\ x$ in Fig. 1. Fig. 3 is a side view of the plate to which the legs and arms are pivoted.

In the said drawings, the reference numeral 1 designates two curved legs, formed at their free or lower ends with inwardly projecting pointed arms 2 and outwardly projecting pointed arms 3. The object of the arms 2 is to take into a cake or block of ice when the arms are forced together so as to enable the same to be lifted while the object of arms 3 is to engage with the upper side of the cake or block when it is desired to draw the block toward the end of a wagon or to pull the same along the ground so as to carry it from place to place without lifting. These arms are formed by bifurcating the ends of the legs, pointing the same and then bending in opposite directions. Near their upper ends these arms cross each other and pass between plates 5 connected together at the top and bottom. They are pivotally connected together by a movable pivot pin 6, which passes through and works in slots 7 in said plates and is provided with heads 8. The upper ends or extremities of these legs are pivoted to crossed arms 9, which are pivoted together by a stationary pin 10 having heads 12. These arms are curved at their upper ends and provided with handles 13.

The legs 1 intermediate their ends at their outer edges are cut away or beveled as seen at 14, forming a knife edge 15, which is employed for trimming the ice so that it will fit in a refrigerator.

The operation will be readily understood. As the handles 13 are forced outwardly the pivoted ends of arms 9 and legs 1, will be also forced outwardly drawing the pivot pin 6 toward the upper ends of the plates 5, and forcing the free ends of the arms apart so that they can engage with a cake or block of ice. When so engaged by pulling on one or both of said handles the pointed arms will take into and clamp the block or cake enabling it to be lifted.

Having thus described my invention, what I claim is—

1. The combination with the two plates connected together at their ends and provided with opposite slots, of the curved crossed legs pivotally connected together, and having oppositely projecting pointed arms at their free ends, the movable pivot pin connecting said legs, working in said slots, the crossed curved arms pivotally connected with said legs, and provided with handles, and the stationary pivot pin, substantially as described.

2. The combination with the two plates connected together at their ends, and provided with opposite slots, of the curved crossed legs pivotally connected together, and having oppositely projecting pointed arms at their free ends, and formed with knife edges intermediate their ends, the movable pivot pin connecting said legs, working in said slots, the crossed curved arms pivotally connected with said legs, and provided with handles and the stationary pivot pin; substantially as described.

In testimony that I claim the foregoing as my own I have hereunto affixed my signature in presence of two witnesses.

JAMES R. FINLEY.

Witnesses:
LEWIS B. SIMS,
JOHN W. FAWCETT.